United States Patent
Ganske et al.

(10) Patent No.: US 10,948,074 B2
(45) Date of Patent: Mar. 16, 2021

(54) METHODS FOR PREDICTIVE SHIFTING

(71) Applicant: Eaton Cummins Automated Transmission Technologies, LLC, Galesburg, MI (US)

(72) Inventors: Charles Adam Ganske, Sedro Woolley, WA (US); Himanshu Singh, Gorakhpur (IN); Jerome J Palazzolo, Kalamazoo, MI (US)

(73) Assignee: Eaton Cummins Automated Transmission Technologies, LLC, Galesburg, MI (US)

( * ) Notice: Subject to any disclaimer, the term of this patent is extended or adjusted under 35 U.S.C. 154(b) by 66 days.

(21) Appl. No.: 16/091,736

(22) PCT Filed: Apr. 7, 2017

(86) PCT No.: PCT/US2017/026556
§ 371 (c)(1),
(2) Date: Oct. 5, 2018

(87) PCT Pub. No.: WO2017/177110
PCT Pub. Date: Oct. 12, 2017

(65) Prior Publication Data
US 2019/0154143 A1    May 23, 2019

(30) Foreign Application Priority Data
Apr. 7, 2016  (IN) .............................. 201611012288

(51) Int. Cl.
*F16H 59/66*    (2006.01)
*F16H 59/70*    (2006.01)
(Continued)

(52) U.S. Cl.
CPC ......... *F16H 61/0213* (2013.01); *F16H 59/66* (2013.01); *F16H 59/68* (2013.01);
(Continued)

(58) Field of Classification Search
CPC ......... F16H 2059/663; F16H 2059/666; F16H 2061/022; F16H 59/66; F16H 59/68;
(Continued)

(56) References Cited

U.S. PATENT DOCUMENTS 7,429,233 B2  9/2008  Bothe et al.
7,850,570 B2  12/2010  Jager et al.
(Continued)

FOREIGN PATENT DOCUMENTS

DE    102006001818 A1    7/2007
WO      2006084530 A2    8/2006
(Continued)

OTHER PUBLICATIONS

International Search Report and Written Opinion dated Jul. 14, 2017 for PCT/US2017/026556; pp. 1-10.

*Primary Examiner* — Tisha D Lewis
(74) *Attorney, Agent, or Firm* — Mei & Mark, LLP

(57) ABSTRACT

A method of shifting an automated transmission in a vehicle comprises tracking vehicle parameters and determining a current gear selection. An upshift threshold can be determined for the current gear selection. Future gradient conditions are determined in a lookahead distance and are processed to determine a first percentage of future conditions that are above a selected gradient threshold. The first percentage of future conditions is compared to a selected first percentage limit to determine that the first percentage of future conditions is within the first percentage limit. The upshift threshold for the current gear selection is adjusted to change the vehicle parameter at which the vehicle transmission shifts from the current gear selection to the adjacent gear. The automated transmission is computer-controlled to shift to the adjacent gear according to the adjusted upshift threshold. A downshift threshold can also be adjusted.

36 Claims, 10 Drawing Sheets

(51) Int. Cl.
  *F16H 61/02* (2006.01)
  *F16H 59/68* (2006.01)
  *F16H 59/44* (2006.01)
  *F16H 59/50* (2006.01)

(52) U.S. Cl.
  CPC .............. *F16H 59/44* (2013.01); *F16H 59/50* (2013.01); *F16H 59/70* (2013.01); *F16H 2059/663* (2013.01); *F16H 2061/022* (2013.01); *F16H 2061/0223* (2013.01)

(58) Field of Classification Search
  CPC .......... F16H 59/44; F16H 59/50; F16H 59/70; F16H 61/0213; F16H 2061/0223
  See application file for complete search history.

(56) References Cited

U.S. PATENT DOCUMENTS

| | | | |
|---|---|---|---|
| 8,700,277 | B2 | 4/2014 | Staudinger et al. |
| 8,781,698 | B2 | 7/2014 | Maier et al. |
| 8,903,578 | B2 | 12/2014 | Yamazaki et al. |
| 9,085,293 | B2 | 7/2015 | Maier et al. |
| 9,221,452 | B2 | 12/2015 | Tang et al. |
| 9,297,455 | B2 | 3/2016 | Li |
| 2004/0068359 | A1 | 4/2004 | Neiss et al. |
| 2006/0293822 | A1 | 12/2006 | Lattemann et al. |
| 2008/0026909 | A1 | 1/2008 | Bothe et al. |
| 2008/0119999 | A1 | 5/2008 | Tiberg |
| 2009/0131217 | A1 | 5/2009 | Jager et al. |
| 2012/0029776 | A1 | 2/2012 | Staudinger et al. |
| 2012/0089309 | A1* | 4/2012 | Kim ..................... B60W 10/08 701/58 |
| 2013/0297106 | A1 | 11/2013 | Yamazaki et al. |
| 2014/0142822 | A1 | 5/2014 | Li |
| 2014/0172253 | A1* | 6/2014 | Palmer ................ F16H 61/0213 701/56 |
| 2014/0229081 | A1* | 8/2014 | Iwase ..................... F16H 59/66 701/51 |
| 2015/0345621 | A1* | 12/2015 | Sujan .................. F16H 61/0213 701/58 |
| 2015/0362065 | A1* | 12/2015 | Johansson ............... F16H 59/68 701/65 |
| 2017/0137029 | A1* | 5/2017 | Dynes .................. B60W 10/02 |

FOREIGN PATENT DOCUMENTS

| | | |
|---|---|---|
| WO | 2006084530 A3 | 11/2006 |
| WO | 2006119918 A1 | 11/2006 |
| WO | 2012038138 A1 | 3/2012 |

* cited by examiner

METHODS FOR PREDICTIVE SHIFTING

This is a § 371 National Stage Entry of Application No. PCT/US2017/026556, filed Apr. 7, 2017, and claims the benefit of Indian provisional application for letters patent No. 201611012288, filed Apr. 7, 2016, all of which are incorporated herein by reference.

FIELD

This application provides methods for shifting a vehicle transmission.

BACKGROUND

A driver with manual control of a transmission can anticipate the need for gear shifts or the ability to hold a gear because of knowledge of the upcoming road gradient or traffic situation. But, automated transmissions use information of the current situation, not the future state, when making shift decisions.

To increase fuel economy, it is generally advantageous to cruise at as low of an engine speed as possible, to reduce friction torque and operate at an efficient engine operating point. This generally puts the cruise speed very close to the peak engine torque, and thus close to a normal shifting point. If a vehicle is operating close to this point on a route that has some elevation changes, this may cause very frequent shifting between top gear and a gear down. This may cause a driver annoyance, and even hurt fuel economy due to the fuel penalty of a torque interrupted shift.

SUMMARY

A predictive shift system could help eliminate the above driver annoyance while maximizing fuel economy. The opportunity for improvement arises when adding the ability to "see" the road ahead, as by feeding gradient information to the automated transmission control unit. The methods disclosed herein overcome the above disadvantages and improves the art by way of a method of shifting an automated transmission in a vehicle, comprising tracking vehicle parameters and determining a current gear selection of a multiple-gear automated transmission. An upshift threshold can be determined for the current gear selection. The upshift threshold indicates a vehicle parameter at which the vehicle transmission shifts from the current gear selection to an adjacent gear of the multiple-gear transmission. The adjacent gear comprises a gear that is sequentially higher in a sequential shift routine. Future gradient conditions are determined in a lookahead distance in the vehicle operation path. A gradient threshold is selected. The future gradient conditions are processed to determine a first percentage of future conditions that are above the gradient threshold. A first percentage limit is selected for restricting the number of future gradient conditions above the gradient threshold in the lookahead distance. The first percentage of future conditions is compared to the selected first percentage limit to determine that the first percentage of future conditions above the gradient threshold is within the first percentage limit. The upshift threshold for the current gear selection is adjusted to change the vehicle parameter at which the vehicle transmission shifts from the current gear selection to the adjacent gear. The automated transmission is computer-controlled to shift to the adjacent gear according to the adjusted upshift threshold.

An alternative technique can be implemented to adjusting a downshift thresholds.

An alternative method for predictive shifting of a vehicle transmission comprises calculating vehicle parameters comprising one or more of engine load and engine speed. A current transmission gear selection is determined. Engine capabilities for the determined current transmission gear selection are determined. The engine capabilities comprise one or both of a downshift threshold and an upshift threshold. The vehicle parameters are compared to the engine capabilities to determine whether the vehicle parameters are within a gear shift range. Future gradient conditions are determined in the vehicle operation path. One or more of a future engine load, a future vehicle speed, or a future fuel economy are calculated based on the future gradient conditions. The method then determines whether to initiate a gear shift or whether to stay in the current transmission gear selection based on the determined gear shift range and the calculated one or more of future engine load, future vehicle speed, or future fuel economy. This permits the vehicle to cruise at as low of an engine speed as possible while the vehicle experiences elevation changes.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures. Upshifting should be understood to mean going from a lower numerical gear to a higher numerical gear, for example, from $9^{th}$ gear to 10th gear. Downshifting should be understood to mean going from a higher numerical gear to a lower numerical gear, for example, from $10^{th}$ gear to $9^{th}$ gear. While certain numerical gears are mentioned, such as $9^{th}$ and $10^{th}$, it should be understood that other gear pairs and numerals are within the scope of the application, such as $1^{st}$, $2^{nd}$, $3^{rd}$ gears, etc. The methods and systems disclosed herein can be applied with appropriate modification to automated transmissions having 5, 10, 13, 18 or other numbers of gears.

Figure 1A:
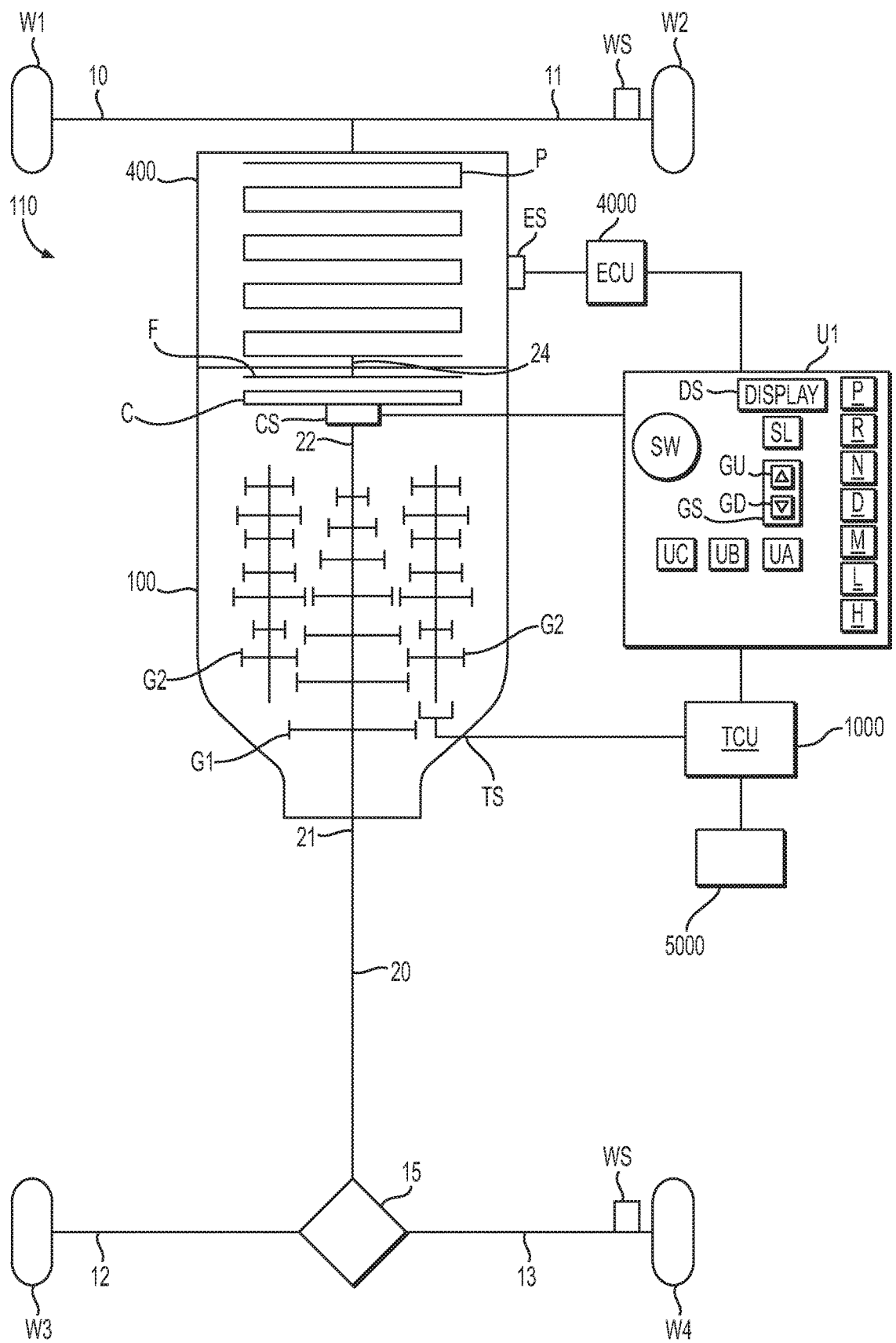
FIGS. 1A & 1B are example layouts of a vehicle and transmission control system.
Figure 1B:
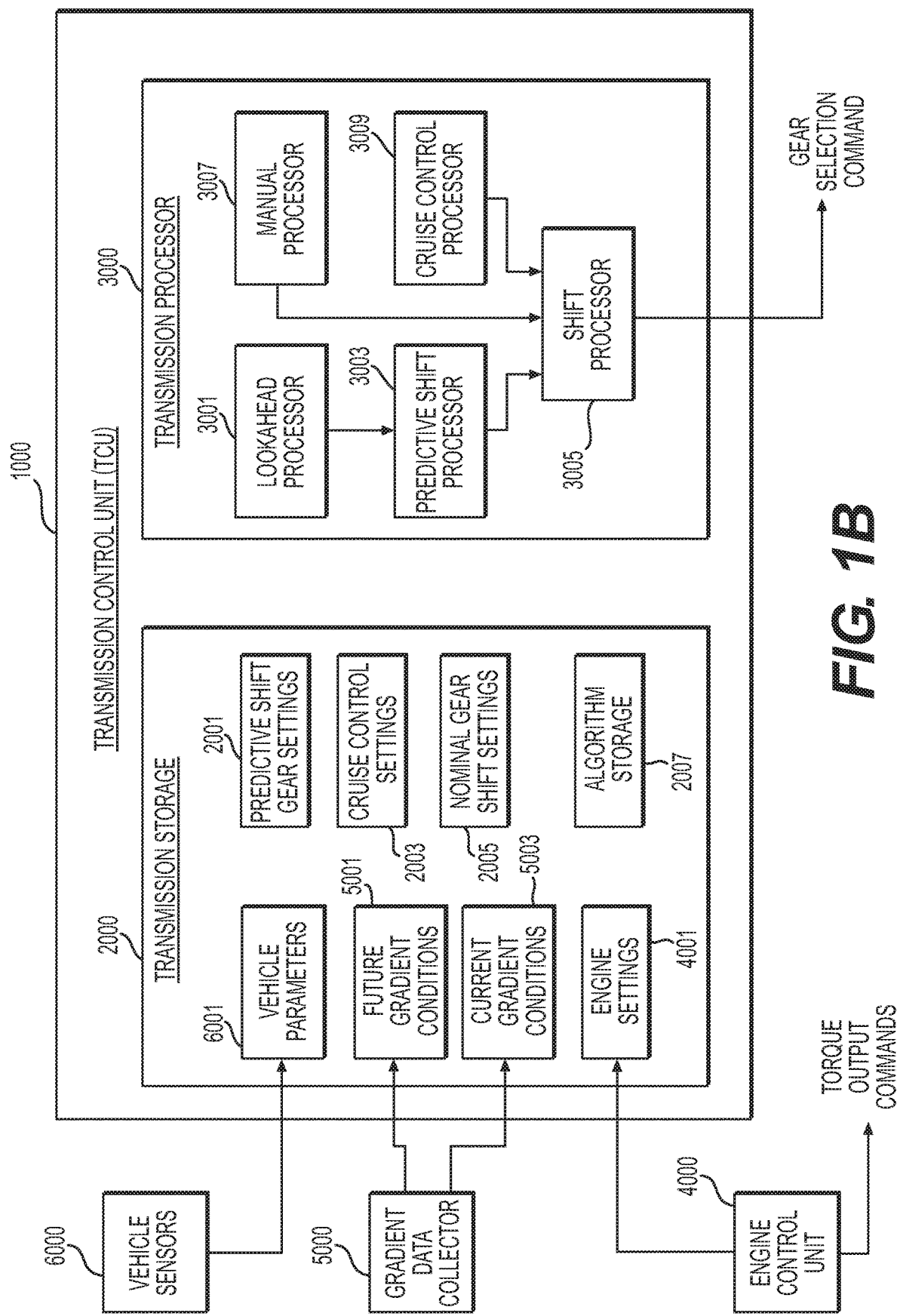

The gradeability of a vehicle can be understood to mean the maximum gradient capabilities of the vehicle at given vehicle parameters. For example, at a certain load, wind speed, mass, engine speed, among others, a vehicle can handle a range of gradients at each gear in the automated transmission 100 without losing speed. For example, a vehicle 110 might handle a gradient of zero to 1.8% while going 50 miles per hour (MPH) in $9^{th}$ gear based on the vehicle parameters, such as load, mass, etc. If the gradient of the terrain is greater than 1.8%, it is greater than the gradeability of the vehicle in $9^{th}$ gear and the vehicle must switch to another gear with a gradeability that can handle the gradient of the terrain or else the vehicle will lose speed. Selecting the other gear can depend on factors such as one or more of how fast the vehicle is moving (MPH), how heavy the vehicle is, the wind forces on the vehicle, the available torque output from the engine, among others. Gradient conditions are shown as a percentage indicative of the change in height divided by the change in horizontal in FIGS. 2A-2C, but gradient can also be expressed as a fraction A vehicle layout is provided in FIG. 1A as an example. Additional wheel axles, different numbers of pistons, rear-wheel drive, all-wheel drive, front-wheel drive, among many other variations are possible. A front axle comprises front shafts 10, 11, which can be unitary or in the form of half-shafts. Wheels W1, W2 can comprise automated braking systems, among other brakes, such as disc or drum brakes. Engine 400 is a torque source and comprises pistons P in cylinders. Numerous engine components are omitted, but within the purview of the application, such as cylinders, fuel injection, etc. A motor can be combined with the engine or can comprise the source of torque in the system. Engine 400 comprises a flywheel F on a crankshaft 24 to output torque. An engine transceiver ES can sense engine conditions and be responsive to driver inputs and automation commands in the vehicle system 110. For example, driver can depress an accelerator pedal as part of acceleration user input UA, or the driver can set a cruise control set speed to control the engine speed.

A clutch C is designated with a clutch transceiver CS. Clutch can be opened and closed by user input to a clutch pedal as part of clutch user input UC, or the clutch can be controlled by automation commands. When the clutch C is closed, it couples to flywheel F to transfer torque from the crankshaft to the transmission 100.

Transmission 100 can comprise any number of gears, but is illustrated as having three shafts, a first with main gears G1 and duplicate side gears G2 on a pair of side shafts. A gear selector TS can comprise an element such as one or more shift forks or other actuators, to select gear pairings among the main gears G1 and side gears G2 to change the gear ratios, and hence change torque throughput of the transmission 100. A drive axle 20 couples to the transmission 100 at a junction 21. Drive axle 20 can comprise a coupler 15, for example, a differential paired with a rear drive unit or auxiliary drive unit, for splitting torque to rear half shafts 12, 13 and rear wheels W3, W4.

Selecting gears tailors the torque sent to the drive shaft 20 and tailors aspects such as vehicle drivability, vehicle speed, and vehicle efficiency, among others. Gear selection can be done by user selections on user interface UI. A display DS can indicate what gear the driver is in. Display DS can be analog or digital. For example, a liquid crystal display (LCD) or other lighted or electronic display can generate a visible indication of the current gear selection. Or, a shifter knob position, or a switch, toggle, button, or other selection mechanism provides a visual or synaptic indication of current gear selection. A service indicator SL, such as a service light, audible device, or synaptic device, can indicate improper gear selection, autonomous driving control override, clutch abuse, engine malfunction, and lubricant condition, among many other conditions. Service indicator SL can be integrated in to or with the display DS depending upon the type and resolution of the display DS.

User interface can comprise a steering wheel SW and park inputs P, such as parking brakes. Gear selections can further comprise neutral N. Idle, start, stop, and coast are exemplary times to use neutral gear. A user selects vehicle direction, as by selecting a gear in a default forward direction, or as by selecting a reverse R gear. The user interface UI comprises a drive input D to trigger the transmission to shift from neutral to forward drive gears. A manual input M indicates that the driver would like to override autonomous driving control and manually select gears. Pressing manual input M can also enable user clutch control via clutch pedal UC. User abuse of the system can cause over-ride of manual mode. For example, if the user selects the wrong gear for the engine torque output, an audible tone from service indicator SL can signal to the driver that the computer control has implemented a gear other than the driver selection.

A multitude of user selections can be included on the user interface UI for further gear selection. For example, a shifter knob can comprise a way to toggle between a high gear selector H and a low gear selector L, or buttons or other inputs can be used. The user can "button up" or "button down," or the user can move through shift stick positions, to move through the gears by using a gear selector GS comprising gear up GU and gear down GD inputs.

One example of an existing transmission 100 comprises a Hi-Lo splitter and a range switch to be used with a gear-shift knob, clutch pedal, brake pedal, and accelerator pedal. In this system, a driver can go through neutral, $1^{st}$ gear low, $1^{st}$ gear high, $2^{nd}$ gear low, $2^{nd}$ gear high, $3^{rd}$ gear low, $3^{rd}$ gear high, $4^{th}$ gear low, $4^{th}$ gear high, $5^{th}$ gear low, and $5^{th}$ gear high, etc. The driver, or the automation systems affiliated with the vehicle system, can select gears based on environmental driving conditions and vehicle conditions, such as affiliated load (type of trailer, weight of load, load imbalance, etc.), vehicle upgrades, engine torque output characteristics, clutch pedal "hardness," transmission shift characteristics, etc. Exemplary systems can comprise Eaton-Fuller transmissions, ULTRASHIFT or ULTRASHIFT Plus land vehicle transmission and parts thereof manufactured by Eaton Corporation of Cleveland, Ohio, or PROCISION land vehicle transmissions and parts therefor manufactured by Eaton Corporation of Cleveland, Ohio. In addition to these examples, other computer-controlled vehicle architectures are compatible with the transmission system features described herein. The principles can apply to heavy duty, medium duty, and light duty vehicles, such as line haul, performance, vocational, truck, bus and other vehicles.

Brake user input UB can comprise a pedal, lever, switch or other interface for braking the vehicle 110. Air brakes, wheel brakes, engine brakes, among others can be used.

Numerous vehicle sensors 6000 are available, such as wheel sensors WS, sensors in or in tandem with the engine transceiver ES, sensors in or in tandem with the clutch transceiver CS, among others. Lateral and longitudinal acceleration can be measured, yaw, slip, fuel consumption, load, mass, wind resistance, among other vehicle parameters can be sensed or input and stored in the control units of the vehicle system 110 for processing. A gradient data collector 5000 can comprise an on-board sensor. Such as a navigation system, a Global Positioning System (GPS) device, a Light Detection and Ranging (LIDAR) device, or a Radio Detection and Ranging (RADAR) device. A networked gradient data collector 5000 can receive gradient conditions through a wireless communication device from a storage device affiliated with a server.

An engine control unit (4000) (ECU), can be used to control many aspects of engine operations, such as torque output, engine speed, fuel use, engine braking, among others. Engine control unit 4000 issues torque output commands so that a desired torque is present at flywheel F. Acceleration user input UA can connect with ECU 4000 so that cruise control settings, accelerator pedal depressions or other engine-related inputs are relayed to the engine 400. Other inputs of the user interface UI can be communicated to the ECU 4000 to ensure the engine operation synchronizes with the remainder of the system. Likewise, the ECU can communicate with other automation systems in the vehicle system 110.

For example, an engine map can be created and stored in a storage device of engine control unit 4000. The engine map can comprise torque output information and engine rotations per minute (RPMs) that can be used to control the torque output of the engine 400 via commands to the engine. The engine map can correlate among information such as fuel economy at a given RPM and torque output at the given RPM. Limits for each RPM can be included to avoid over-loading the engine. The engine 400 has a peak torque output and a peak RPM that can be achieved without damaging the engine 400. The engine map can be designed so that when it is processed, it permits the engine control unit 4000 to operate the engine 400 within the torque output and RPM capabilities of the engine.

An accelerator pedal 20 or cruise control system 22 can inform the engine control unit 4000 of a desired vehicle speed. At times, inputs from a current speed sensor, an accelerator pedal 20, and cruise control system 22 must be reconciled. The engine map 4004 can be processed to determine the engine RPMs needed to achieve the desired vehicle speed. The engine RPMs can be adjusted for corollary matters, such as fuel economy, engine braking, desired torque output, among others.

The current speed, engine map 4004, and desired vehicle speed can be shared with the transmission control unit (TCU) 1000 and stored in an engine setting block 4001 of the transmission storage device 2000. Engine crankshaft RPMs (rotations per minute) and crankshaft torque output can likewise be stored. Each gear in the automated transmission 100 can handle a respective range of engine RPMs without issue. The respective ranges can overlap among some adjacent gears to result in ranges where both gears have similar efficiency. But, some non-adjacent gears are not designed to handle the engine RPMs of other gears. So, at a certain engine RPM, it is detrimental to select one of the gears, while another gear selection is acceptable. For example, $1^{st}$ gear is not adjacent to and would not overlap with the RPM capabilities of $9^{th}$ gear, though adjacent $9^{th}$ gear and $10^{th}$ gear could share an overlapping range of engine RPMs where either gear could be selected. Selecting $1^{st}$ gear when $9^{th}$ gear is appropriate can cause gear grinding, speed control issues, or other issues. However, the engine RPM could be such that it is possible to select $9^{th}$ gear or $10^{th}$ gear. The higher gear can have greater fuel economy, and can be the preferred gear for selection according to some vehicle parameters. However, the gradeability of the vehicle in $10^{th}$ gear could indicate that it is better to select $9^{th}$ gear. So, gear selection can be made by considering factors in addition to engine RPMs. The control algorithms can reference predetermined values stored in transmission storage 2000, or the transmission processor 3000 can make real-time calculations to account for the various combinations of vehicle parameters to result in current and future gear selections. As another example, it is possible to select the current gear or the future gear based on which is the direct-drive gear and which is the over-drive gear. The control algorithm can be biased to select direct-drive gears before over-drive gears when it is predicted that the current gear selection and one or both adjacent gears have similar efficiency in the predicted operation range.

Predictive shifting control algorithms can avoid "gear hunting," where the transmission frequently changes gear during a terrain that changes the speed of the vehicle. As above, it is possible to pre-program an automated transmission to meet a cruise speed at very close to the peak engine torque, and thus close to a normal shifting point. If a vehicle is operating close to this point on a route that has some elevation changes, this may cause very frequent shifting between a top gear and a gear down. So, the algorithms proposed herein adjust the shift-points for the transmission in view of gradient changes in the pathway ahead of the vehicle. This improves fuel economy by avoiding shift penalties, improves the ability to maintain vehicle speed, and improves the operator experience by facilitating a smoother ride. The automated system is also capable of discerning gradient changes that a driver may miss.

The automated transmission control unit (TCU) 1000 receives vehicle parameters from vehicle sensors 6000 and stores them in vehicle parameters block of transmission storage device 2000. Transmission storage device 2000 can comprise one or more devices, such a ePROM, RAM, ROM, USB, DRAM, and other physical media for storing data. Read and write capabilities can be enabled. More discrete blocks can be used to further separate data, or blocks can be combined. Lookup tables (LUTs), keyed or tagged storage areas, compressed file areas, among others, can be used to organize the data. Vehicle parameters can comprise, among other data, current or actual vehicle speed, engine speed, drive shaft speed, wheel speed, current gear selection, and correlation tables therefor. Correlation tables for threshold parameters such as speed, gears, acceleration, variables, conversion factors, among other predetermined data can also be stored in transmission storage 2000. Transmission storage device 2000 also comprises algorithm storage block 2007 for storing therein algorithms for executing the methods disclosed herein.

So, a control system for a vehicle transmission can comprise a processor in the form of transmission processor 3000, a memory device in the form of transmission storage device 2000, and stored algorithms, the stored algorithms configured to execute the methods herein. A computer readable medium can comprise a portion of the transmission control unit 1000 as a commercial commodity for sale and installation. The computer readable medium can comprise a storage device such as transmission storage device 2000 and processor-executable instructions to perform, when executed by a processor, the methods disclosed herein. Such as computer readable medium can comprise formatting instructions for formatting a processor to implement the processing of transmission processor 3000.

Additional storage blocks can comprise a future gradient conditions block 5001 and current gradient condition block 5003, which can collect gradient conditions from gradient data collector 5000. On-board sensors and networked data sources can work together or separately to collect gradient condition data and can comprise one or more of the devices listed above, or equivalents thereof.

A cruise control settings block 2003 can store threshold parameters for changing gears or for calculating upshift or downshift threshold adjustments. Driver inputs for moving the vehicle at a driver speed can also be stored. At times, fleet management inputs cruise control settings to restrict top speeds, and these can be stored here and can be used to restrict or saturate upshift or downshift threshold adjustments.

Nominal gear shift settings block 2005 can store nominal upshifts and nominal downshifts so that when predictive shift routines for shifting an automated transmission in a vehicle are not implemented, the vehicle can shift according to standard shift routines. This can occur when, for example, processing the gradient conditions indicates that standard cruise control or manual driver inputs would result in satisfactory fuel economy. A steep downhill, for example, can indicate that the predictive shift routines disclosed herein are not necessary. Nominal gear shift settings block 2005 can also comprise the gradeability of each gear at corresponding vehicle parameters. For example, the vehicle parameters can comprise a load and a speed. Each gear of the multiple-gear transmission can comprise a gradeability for a corresponding load and for a corresponding speed. The gradeability can comprise a range of gradients up to a maximum positive gradient at which the gear is designed to maintain the vehicle at the corresponding speed at the corresponding load. A sequential shift routine can also be stored, and the shift routine can be accessed to determine in which order the gears are shifted among, and the process for moving the gear selector TS to select among the gears. The sequential shift routine can be consulted, along with the gradeability, to determine when to shift gears due to changes in the gradient conditions. Maximum settings per gear, such as torque or load, can be applied and referenced in the application of a saturator to avoid adjustments to upshift or downshift thresholds that are outside the rated capacity of the gear.

The predictive shift gear settings block 2001 can comprise data for processing the method of shifting an automated transmission in a vehicle. The data stored herein can, along with other the stored data, be used to predict when gradient conditions permit upshift and downshift threshold adjustments, or to predict when a gear shift prior to a change in gradient would be beneficial to the vehicle system 110. Threshold factors, gradeability factors, upshift and downshift scalars, maps to threshold parameters, first and second percentage limits, predetermined gradient values, cutoffs for current grad values, saturator values per gear, can all be stored in the predictive shift gear settings block 2001. Disconnecting the clutch to shift gears can result in loss of torque transfer from the engine to the transmission, and so a loss in speed is incurred and fuel consumption is wasted during the uncoupled condition. So, the stored data can be based on predetermined calculations considering fuel economy penalties and speed penalties. Or, an additional data block can store data for calculating fuel economy penalties and speed penalties real time.

Data stored in the transmission storage device 2000 can be shared with the transmission processor 3000. One or more physical processors can make up the transmission processor 3000, or the transmission processor 3000 can be parsed in to subdivisions for discrete processing. Allocation programming can also be used. In the illustrated example, a main processor component is divided in to processor blocks according to allocation programming, though a network of processors can be connected instead.

A manual processor 3007 can be included to process inputs from a driver, or to otherwise process transmission decisions using the data from nominal gear shift settings block 2005. Certain terrains benefit from cruise control, and cruise control processor 3009 can process speed settings from a driver or other source along with data from cruise control settings block 2003 to provide automated transmission and vehicle system decisions. Both manual processor 3007 and cruise control processor 3009 can rely on data stored in other blocks for transmission storage device 2000.

Figure 2A:
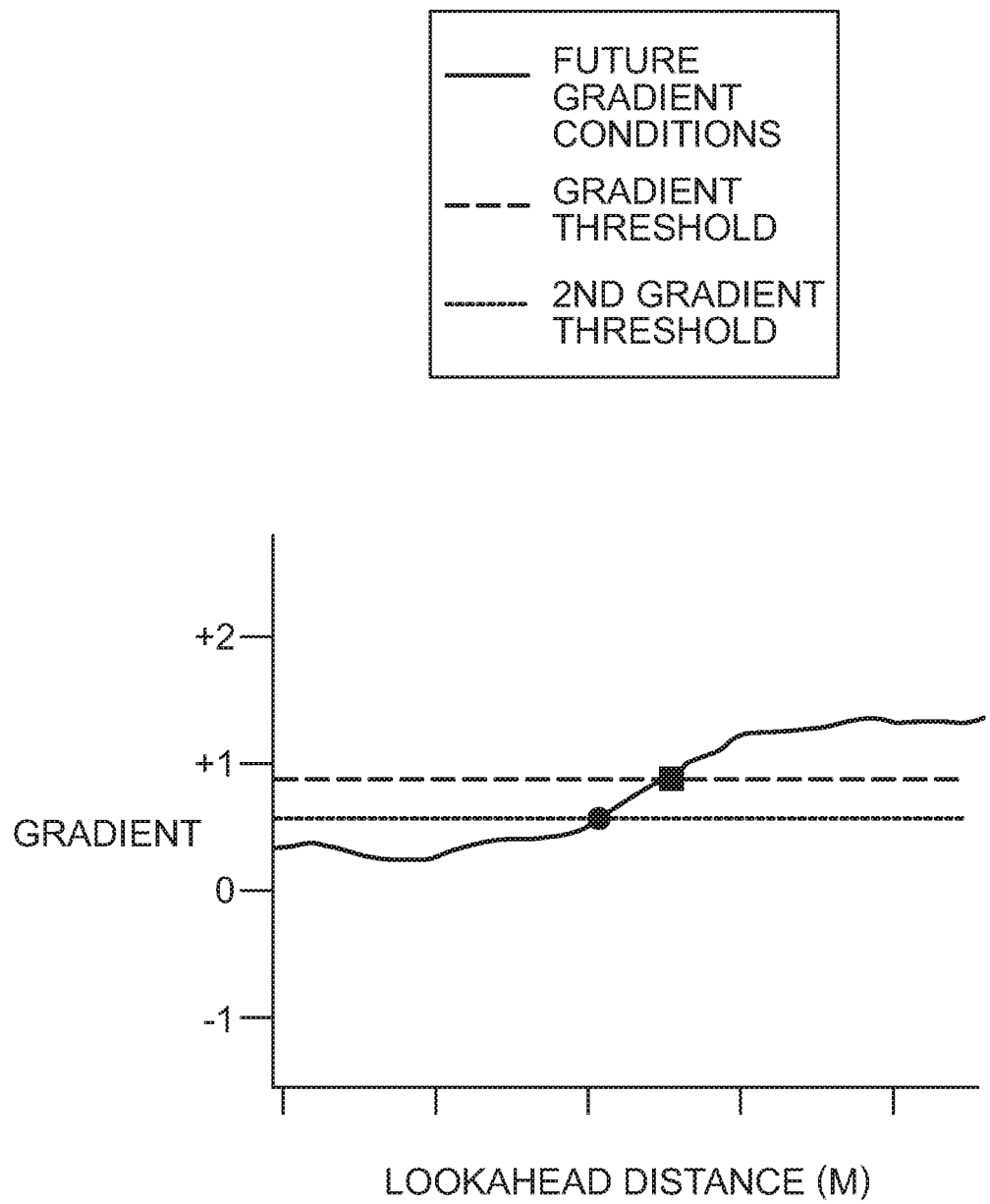
FIGS. 2A-2C are explanatory examples of gradient conditions over lookahead distances.
Figure 2B:
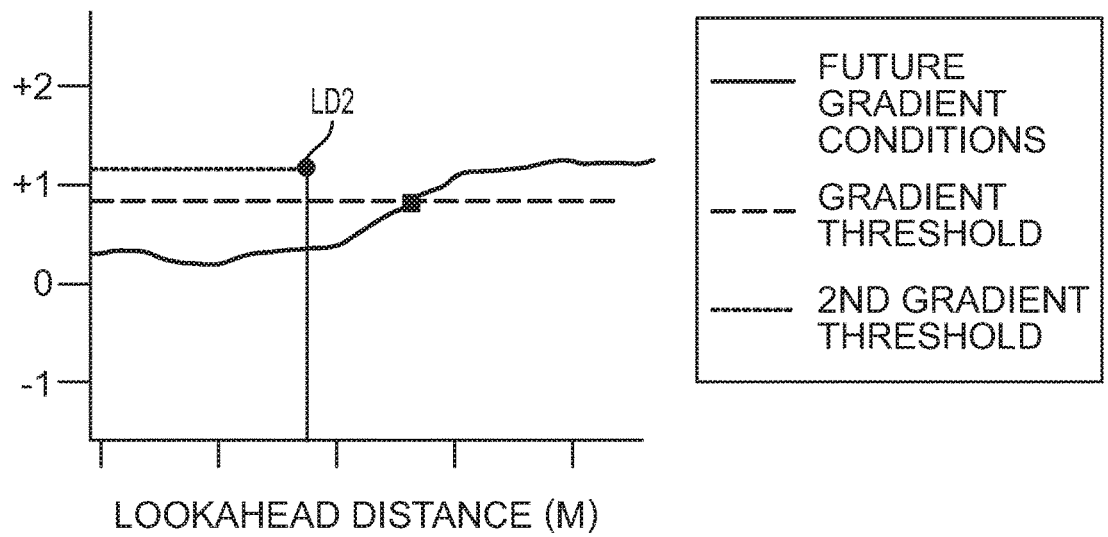
Figure 2C:
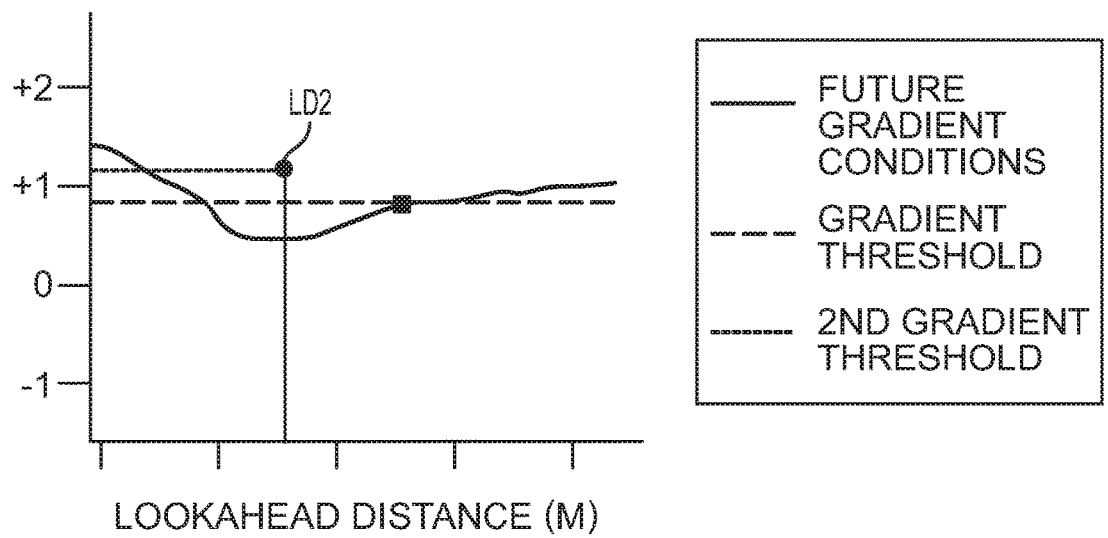
Figure 3A:
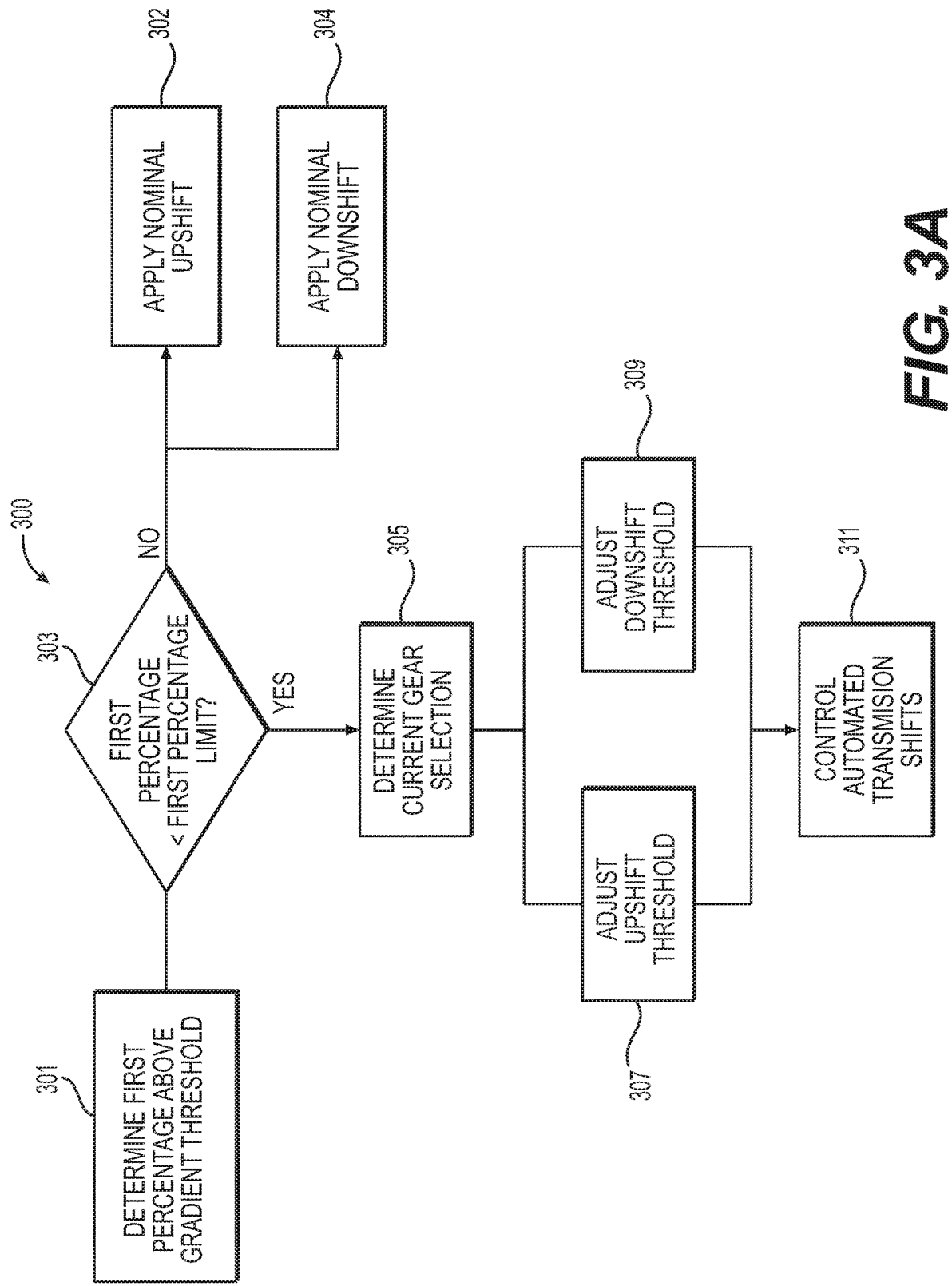
FIGS. 3A-3C are flow diagrams for methods of determining whether to implement predictive shift routines for shifting an automated transmission in a vehicle.

Lookahead processor 3001 can pick lookahead distance and second lookahead distance based on fixed settings. For example, vehicle speed could dictate how far ahead to look, and can scale so that high speeds correlate to longer overall lookahead distance, and shorter near term second lookahead distances. A plurality, more than one or two, lookahead distances can be determined, based on vehicle parameters. For example, a high windspeed or a steep gradient as a vehicle parameter could trigger inclusion of additional lookahead distances over a basline number of lookahead distances. In FIGS. 2A & 3A, only a single lookahead distance is used, while FIGS. 2B, 2C & 3C comprise a second lookahead distance. Lookahead processor can process the future gradient conditions of block 5001 and current gradient condition of block 5003. When a high number of samples are available, the sample size can be culled. For example, a networked gradient data collector 5000 can stream gradient conditions to the transmission storage device 2000, and the lookahead processor can snip the streamed data in to packets of appropriate size. Or, the lookahead processor can check for sufficient gradient points to provide a meaningful prediction and issue a command to gradient data collector 5000 to send additional gradient conditions when the current data is insufficient.

With one or more lookahead distances selected, the predictive shift processor 3003 can implement one or more methods of shifting an automated transmission in a vehicle. The shift processor 3005 can provide comparative control among the predictive shift processor 3003, manual processor 3007, and cruise-control processor 3009. The shift processor 3005 can provide safety checking, saturation calculations, upshift and downshift threshold adjustments that take in to consideration the need to reconcile inputs from other vehicle system components, among others. Shift processor 3005 can provide the ultimate gear selection command to the automated transmission 100 and thereby control gear selector TS.

Returning to the functionality of the predictive shift processor 3003, and referencing FIG. 2A, a lookahead distance in meters is selected, and a plot shows the gradient of the terrain in the vehicle operation path for the lookahead distance. The distance is shown in meters (M), though other units can be used. Gradient is sometimes given as a percent above zero for uphill conditions, and given as a negative percent for downhill conditions. Gradient conditions indicate a change in slope, or steepness, of the terrain. For a select line in the lookahead distance, the gradient changes in FIG. 2A from about 0.5% to 1.4%. The future gradient conditions indicate slight rolls in a slight hill. In nominal operation, the transmission 100 might shift gears several times over the lookahead distance, resulting in fuel economy penalties at each shift and further resulting in speed loss and lurching at each shift. However, using the process outlined, the lookahead distance is traversed without shifting from a current gear selection to an adjacent gear selection. The future gradient conditions are processed so that the vehicle flows over the slight rolls without gear shifts. When necessary, the transmission 100 can shift from the current gear to an adjacent gear prior to encountering the future gradient conditions so that the gear with the most appropriate gradeability is used for the future gradient conditions, but the transmission 100 does not "gear hunt" throughout the future gradient conditions. This could result in slight losses in speed, should the gradeability of the gear still not be a perfect match for the future gradient conditions, but the losses can be minimal compared to those losses encountered by the gear shifting process. So, a portion of the control logic can comprise a comparator for computing total loss in speed, travel time or fuel economy based on whether nominal operation or predictive shift operation is used.

Relating FIG. 3A to FIG. 2A, a method for shifting an automated transmission in a vehicle comprises tracking vehicle parameters. The vehicle parameters can comprise a load and a speed. A current gear selection of a multiple-gear automated transmission is determined. Nominal conditions for the current gear selection are determined by referencing the nominal gear shift settings in block 2005. An upshift threshold for the current gear selection is determined. The shift processor 3005 can apply the nominal upshift in step 302, if needed. The upshift threshold indicates a vehicle parameter, such as engine RPM, at which the vehicle transmission shifts from the current gear selection to an adjacent gear of the multiple-gear transmission 100. In the upshifting scenario, the adjacent gear comprises a gear that is sequentially higher in a sequential shift routine.

FIG. 2A shows the determined future gradient conditions in a lookahead distance in the vehicle operation path. Slight hills, chuckholes, divots and other gradient changes can be detected and processed. A gradient threshold is selected. A square point indicates where the threshold intersects the future gradient conditions. Some future gradient conditions are above the gradient threshold, and others are beneath the gradient threshold. Using at least one gradient threshold checks if there are sufficient points with a small positive gradient related to the gradeability for triggering the predictive shift upshift threshold adjustments. If there are not enough points, then nominal operation can be used.

The predictive shift processor 3003 processes the future gradient conditions to determine a first percentage of future conditions that are above the gradient threshold, as in step 301. From the square point onward, the gradient conditions indicate all points are above the gradient threshold. So, in this example, 40% of the future gradient conditions are above the gradient threshold. This is in favor of activating the predictive shift. However, there is a limit to how many future gradient conditions can be above the threshold, because a drop in vehicle speed may be incurred if an adjacent gear is not selected. So, a first percentage limit for restricting the number of future gradient conditions above the gradient threshold in the lookahead distance is selected. The first percentage of future conditions is compared to the selected first percentage limit to determine whether the first percentage of future conditions above the gradient threshold is within the first percentage limit, as in step 303. If this is true, the predictive shift method continues; but, if not, nominal gear shifting is applied in steps 302 & 304.

As above, the current gear selection is determined, as in step 305. When a gear is low for the gradeability, and it is likely to upshift, the upshift threshold is adjusted in step 307. When the gear is high, and likely to downshift, the downshift threshold is adjusted in step 309.

Continuing the upshift example, the upshift threshold for the current gear selection is adjusted to change the vehicle parameter at which the vehicle transmission shifts from the current gear selection to the adjacent gear. This can be done to encourage an early upshift, so as to improve fuel economy. Limiting the first percentage of future conditions above the gradient threshold, as above, ensures that any fall in vehicle speed due to the early upshift is adequately planned for and adequately linked to the changes in positive gradient. The automated transmission can be controlled to shift to the adjacent gear according to the adjusted upshift threshold, as in step 311.

Adjusting the downshift threshold is similar in many respects, but differs in that, when determining a current gear selection, a downshift threshold for the current gear selection is determined. The downshift threshold indicates a vehicle parameter at which the vehicle transmission shifts from the current gear selection to an adjacent gear of the multiple-gear transmission, the adjacent gear comprising a gear that is sequentially lower in a sequential shift routine. Adjusting the downshift threshold for the current gear selection in step 309 changes the vehicle parameter at which the vehicle transmission shifts from the current gear selection to the adjacent gear. But, the adjustment encourages the transmission 100 to stay in the current gear selection for a longer period of time.

Figure 3B:
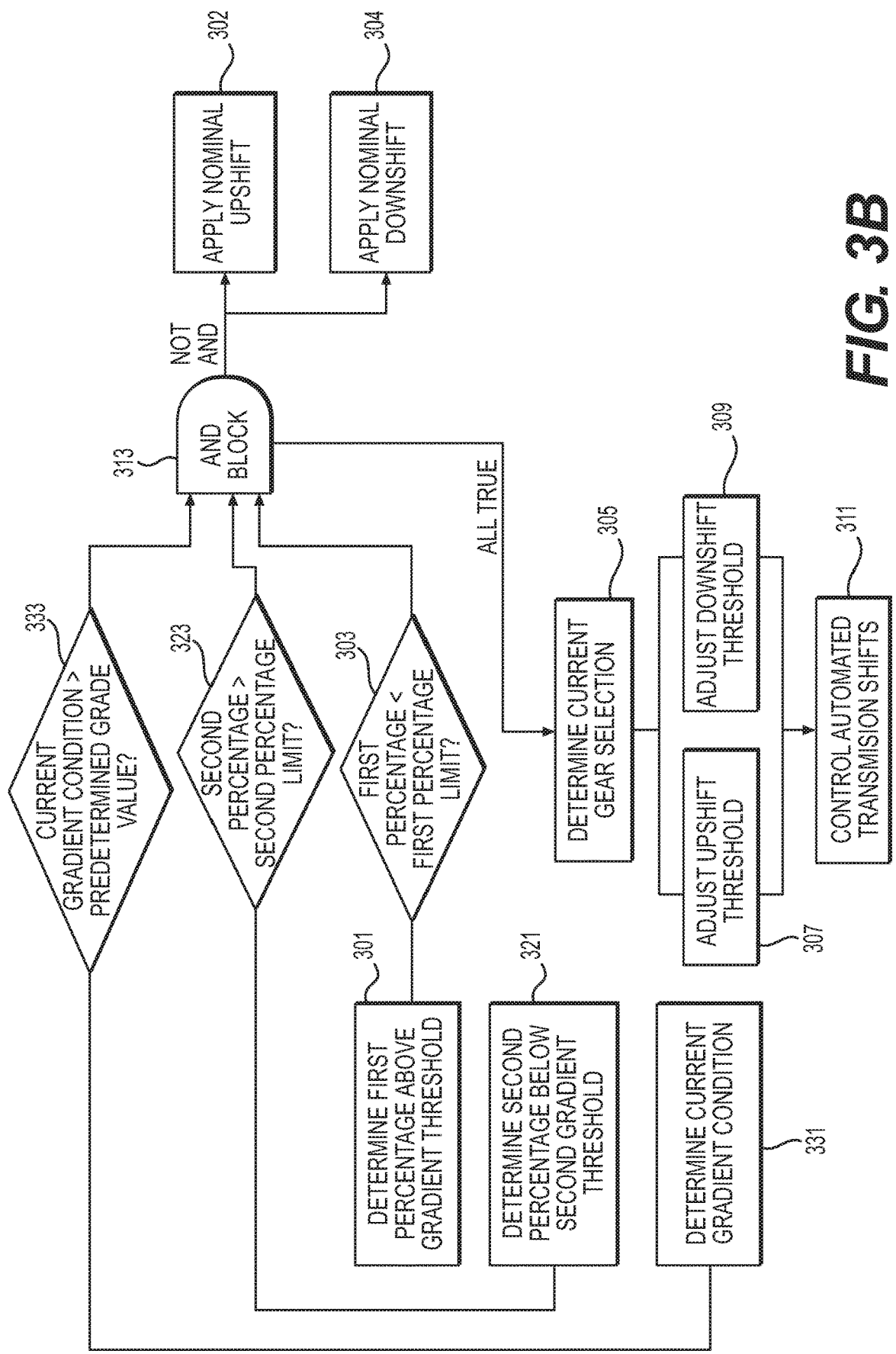
Figure 3C:
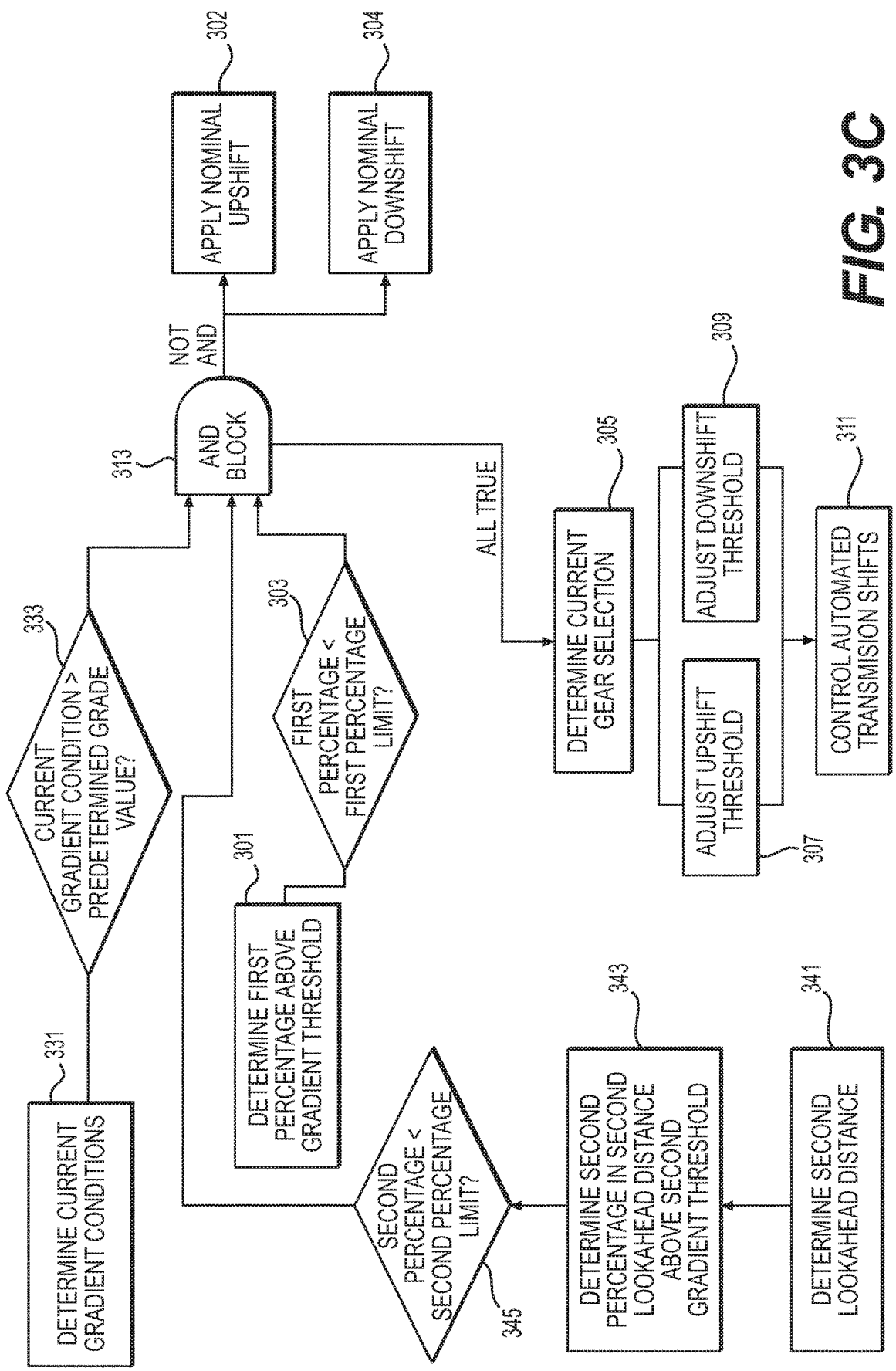

Additional layers can be added to the baseline predictive shift method, as in FIGS. 3B & 3C. As above, a second gradient threshold can be used for processing the future gradient conditions. In FIG. 2A, the second gradient threshold intersects the gradient conditions at the circle. About 55% of the future gradient conditions are below the second gradient threshold. The gradient threshold differs from the second gradient threshold in this example by a gradeability factor of 0.5. This ensures that there is some mismatch between the future gradient conditions in each set of future gradient conditions. Other gradeability factors are possible, such as 0.10, 0.25, 0.75, etc. Applying the concept to another example, determining current vehicle parameters can comprise determining a current load and a current speed. When selecting the second gradient threshold, it can be a gradeability factor less than the maximum positive gradient at which the gear is designed to maintain the vehicle at the current speed at the current load. Or, the second gradient threshold can be a fixed amount different than the baseline gradient threshold.

Having selected a second gradient threshold less than the gradient threshold, the method can continue by processing the future gradient conditions to determine a second percentage of future conditions that are below the second gradient threshold, as in step 321. In FIG. 3B, a second percentage limit can be selected for restricting the second percentage of future conditions that are below the second gradient threshold. As in step 323, the second percentage of future conditions can be compared to the selected second percentage limit to determine that the second percentage of future conditions below the gradient threshold is above the second percentage limit. This technique accounts for the conditions where the predictive shift method is activated when there is no negative gradient to help the vehicle reacquire speed gravitationally, or when the gradient comprises a high positive value in the lookahead distance. So, the first percentage limit and the second percentage limit can be selected in view of one another, in view of the future gradient conditions, as factors of one another or of the gradeability, or according to another predetermined scheme so that the outcome is fuel economy or other travel economy in consideration of the future gradient conditions.

FIG. 3B further contemplates an alternative where the current gradient condition is considered in block 331. This determination can prevent activation of predictive shift methods, despite future positive gradient conditions, while the vehicle is in a downhill condition. So, the current gradient condition can be required to be larger than a negative gradient, for example, a slight negative gradient of −0.03. Some shifting is permitted at negative gradients to build speed or to gravitationally recuperate the losses of the gear-shifting process. The minimum current gradient condition can take in to account whether the shift will effectively brake the vehicle or whether the vehicle will receive efficiencies. The vehicle can absorb gravitational speed accumulation benefits, or implement downhill braking techniques, without interference in planning for an upcoming change in gradient conditions. An AND block 313 can be included to require that all three conditions outlined be true: current gradient condition above a predetermined gradient value in step 333, second percentage greater than its corresponding limit in step 323, and first percentage greater than its corresponding limit in step 303. Only if all three are true does the predictive shift method continue. Otherwise, nominal operation, or some alternative operation (braking, cruise-control, manual operation, etc.) ensues.

In FIG. 2A, the same lookahead distance was applied to future gradient conditions considered against both the gradient threshold and the second gradient threshold. Alternative methods are shown for using two lookahead distances as outlined in FIGS. 2B & 2C. Selecting a second lookahead distance is now a subset of the lookahead distance. Second lookahead distance terminates at point LD2. The second lookahead distance can be selected based on vehicle parameters such as vehicle speed, vehicle mass, load, among others. Current or future gradient can also impact the second lookahead distance. This checks the next small distance for extreme gradient changes that may or may not fit within the logic. The alternative also accounts for when the gradient threshold is set to be the same value as the maximum gradeability of the current gear. If the gradient is currently steep, unnecessary shifts can be avoided.

Aspects of FIG. 3A are repeated in FIGS. 3B & 3C and are incorporated here. Some aspects of FIG. 3B are likewise repeated in FIG. 3C with incorporation. In FIG. 3C, with the second lookahead distance determined in step 341, a subset of future gradient conditions are determined in the second lookahead distance. The second gradient threshold is more than the gradient threshold. For example, after determining current vehicle parameters comprising a current load and a current speed, it is possible to select the second gradient threshold to be a gradeability factor more than the maximum positive gradient at which the gear is designed to maintain the vehicle at the current speed at the current load.

The subset of future gradient conditions is processed to determine a second percentage of future conditions in the second lookahead distance that are above the second gradient threshold, as in step 343. In FIG. 2B, no gradient conditions meet this criteria, while in FIG. 2C, a few gradient conditions are above the second gradient threshold. In both FIGS. 2B & 2C, the baseline criteria of FIG. 3A are satisfied, and there are sufficient gradient conditions to trigger the predictive shift methods. Depending upon where the second percentage limit is set, for example, 20%, 50%, 70% or 90%, the predictive shift method may or may not be exited in FIG. 2C. The second percentage limit can be chosen based on steepness of the gradient, saturation values for the gear, gradeability data, vehicle speed, among others.

In step 345, after selecting the second percentage limit for restricting the second percentage of future conditions that are above the second gradient threshold, the method compares the second percentage of future conditions to the selected second percentage limit to determine that the second percentage of future conditions below the gradient threshold is below the first percentage limit.

Additional functionality can be programmed in to the control logic. For example, adjusting the upshift threshold can be done to decrease time spent in the current gear and to decrease time shifting in to or out of the adjacent gear. Adjusting the downshift threshold can be done to increase time spent in the current gear and to decrease time shifting in to or out of the adjacent gear. It is possible, because of the predictive nature of the methods, to shift from a current gear to an adjacent gear prior to the vehicle encountering the future gradient conditions.

Figure 4A:
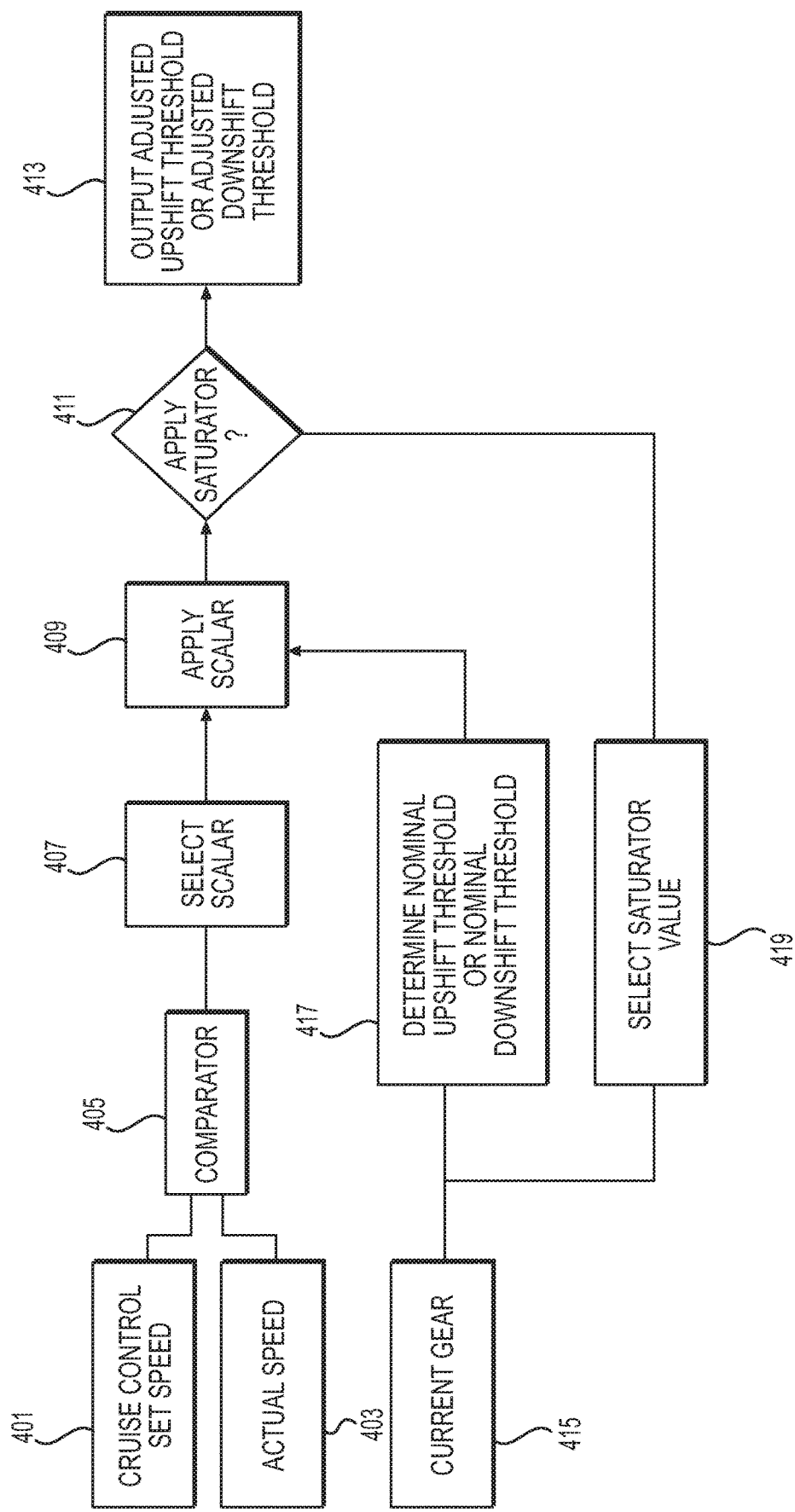
FIGS. 4A-4C are flow diagrams for methods of calculating adjusted upshift thresholds or adjusted downshift thresholds.
Figure 4B:
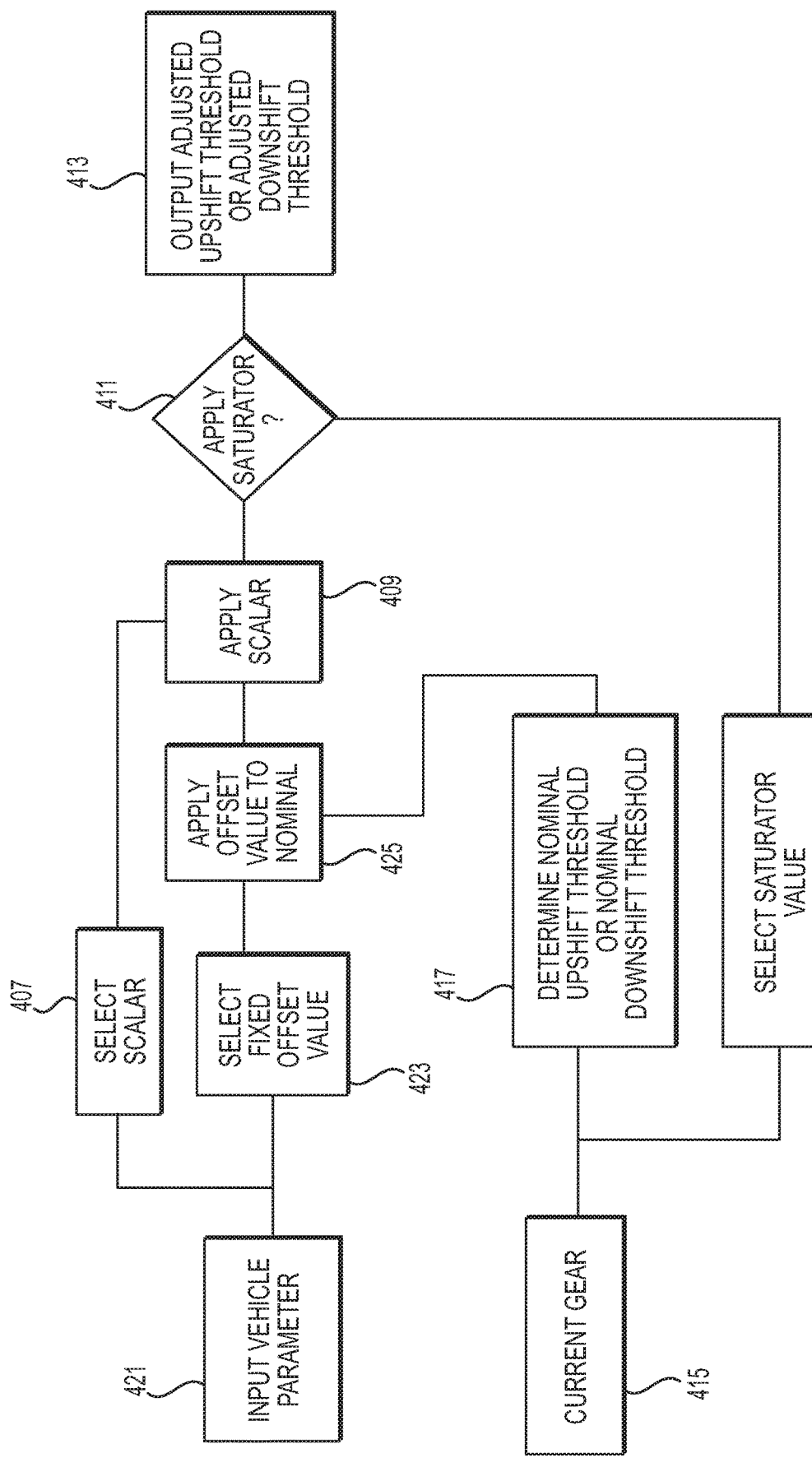
Figure 4C:
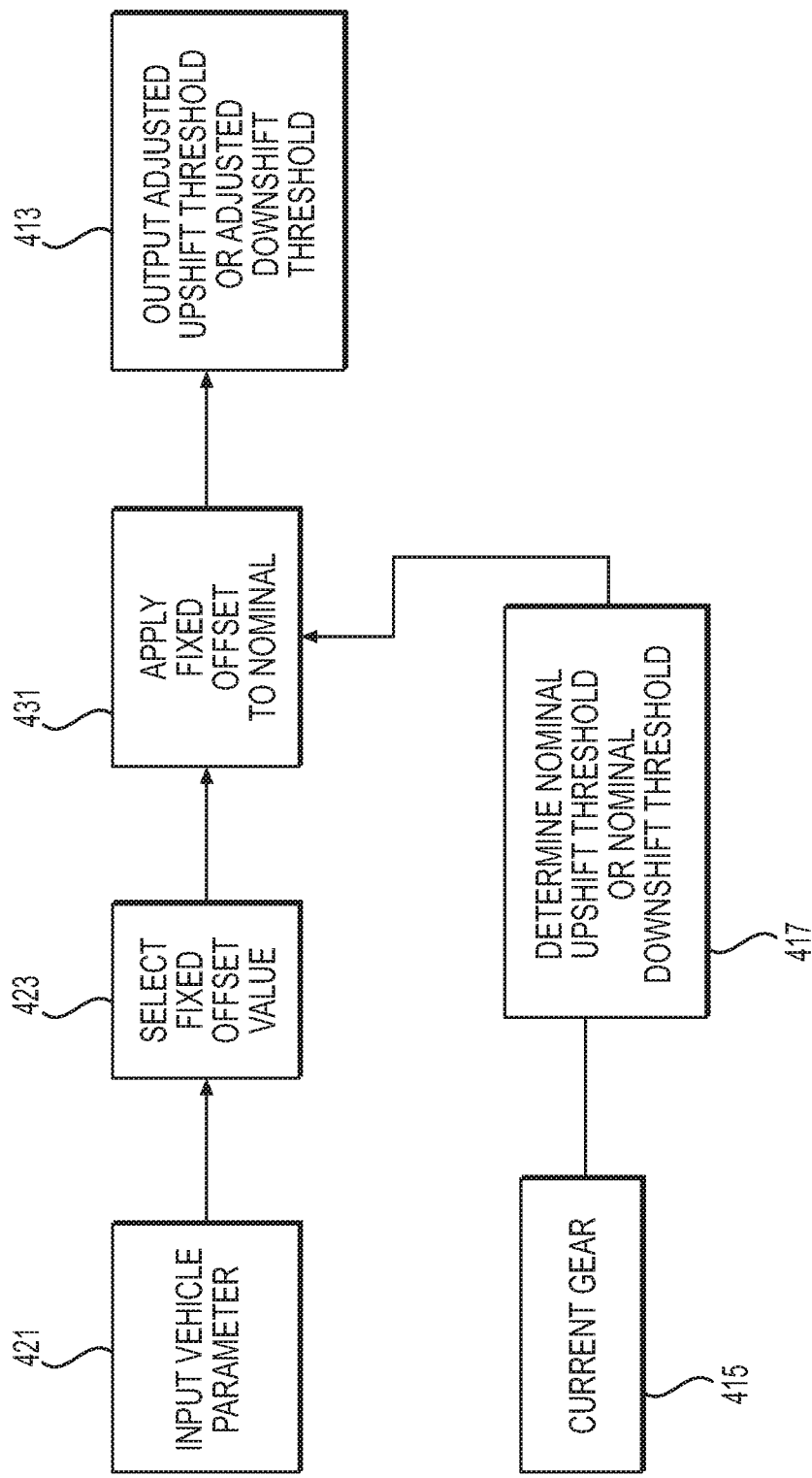

Turning now to FIGS. 4A-4C, consider now adjusting the upshift threshold and adjusting the downshift thresholds. In addition to reasons already stated, adjusting the upshift threshold can be done to initiate a gear shift to a lower engine speed, and adjusting the downshift threshold can be done to maintain a constant engine speed.

In FIG. 4C, it is possible to apply a fixed offset to adjust the upshift threshold or to adjust the downshift threshold. Inputting a vehicle parameter in step 421 can lead to processing the vehicle parameter to correlate it to one or more fixed offset value. In step 423, the fixed offset value can be selected from a lookup table (LUT) or another correlation technique, such as multiplying by a fixed factor. For example, it is possible to relate the vehicle speed to the nominal upshift and downshift thresholds. So, when predictive shift methods are active, it is possible to upshift a few miles per hour lower than nominal, or to downshift a few miles per hour higher than nominal. The fixed offset can differ based on whether an upshift threshold is adjusted versus a downshift threshold being adjusted, or the fixed offset can be the same for both scenarios. In step 431, the fixed offset is applied to nominal upshift or downshift threshold, as the case may be. So, if nominal upshift happens at 50 MPH, then it could occur at 48 MPH, for example. Or, if nominal downshift happens at 55 MPH, then it could occur at 52 MPH, for example. The nominal upshift and nominal downshift thresholds are gear-dependent, and so steps 415 and 417 persist to input the current gear and to determine the nominal upshift threshold or nominal downshift threshold, as the case may be. After applying the fixed offset, in step 413, the adjusted upshift threshold or the adjusted downshift threshold is outputted for use by the shift processor 3005 for issuing gear selection commands.

In FIG. 4B, additional layers are applied to the method of FIG. 4C. Adjusting the upshift threshold or the downshift threshold for the current gear selection to change the vehicle parameter at which the vehicle transmission shifts from the current gear selection to the adjacent gear comprises inputting a vehicle parameter 421. For example, a vehicle speed can be the vehicle parameter. Predictive shift processor 3003 can analyze the vehicle parameter to determine a threshold parameter. In one non-limiting example, the threshold parameter is 50 MPH. If the actual input vehicle parameter is greater than 50 MPH, then the amount of offset is greater. If the actual input vehicle parameter is less than 50 MPH, then the amount of offset is less. A table, sliding scale, set of factors, among others, can be used to select a scalar in step 407. Building on the above example for FIG. 4C, if the upshift threshold were lowered to 48 MPH, then a scalar could be applied in step 409 to adjust the upshift threshold further. The scalar could be different if a fixed offset value application moved an upshift threshold from 30 to 28 MPH. So, adjustments to the upshift threshold or to the downshift threshold can be preconfigured to increase as the speed increases. Correlating the threshold parameter to an upshift scalar can likewise be done to correlate the threshold parameter to a downshift scalar.

As a further safety, a saturator value can be selected in step 419 and applied, if needed, in step 411 to ensure that deleterious settings are not employed.

As in FIG. 4A, the upshift threshold and the downshift threshold can be correlated to an automated cruise-control setting, and adjusting from nominal can likewise be correlated to an automated cruise-control setting. If cruise control is active, a cruise control set speed can be input in step 401. The actual vehicle speed can be input in step 403. A comparator step 405 can compare the set speed to the actual speed. Differences detected can trigger the selection of a scalar in step 407. The scalar can now depend on the magnitude of the difference between the cruise control set speed and the actual vehicle speed. Applying the scalar in step 409 can encourage reconciliation of the difference detected by comparator step 405.

Further as to cruise control settings, the methods herein can further comprise determining a cruise control set speed to select a gear shift threshold. The cruise control set speed can be calculated by a predictive cruise control system. Alternatively, the cruise control set speed can be modified by a predictive cruise control system.

As an example, a predictive cruise control system could be part of the cruise control processor 3009. It could process fuel economy and shift penalty information that enables real-time processing of the vehicle parameters to determine if implementing the predictive shift methods would be worthwhile. The predictive cruise control can handshake with the predictive shift processor 3003 by way of the shift processor 3005. The transmission processor 3000 could calculate how long the transmission 100 would be able to stay in the current or predicted top gear due to the current vehicle and road conditions, and whether the fuel economy improvement would be worthwhile to make a shift to top gear or to stay in top gear. The predictive shifting can use the gradeability of the truck and the cruise control set speed to determine the shift point with the help of the future gradient conditions.

As a further alternative, a method for predictive shifting of a vehicle transmission can comprise calculating vehicle parameters comprising one or more of an engine load and an engine speed. Comparing the vehicle parameters to the engine capabilities can yield a determination whether the vehicle parameters are within a gear shift range. In light of future gradient conditions in the vehicle operation path, it is possible to calculate one or more of a future engine load, a future vehicle speed, or a future fuel economy based on the future gradient conditions. Predictive shift methods can be used to determine whether to initiate a gear shift or whether to stay in the current transmission gear selection based on the determined gear shift range and the calculated one or more of future engine load, future vehicle speed, or future fuel economy. The method can be based on lookahead distances, as above.

When it is determined to stay in the current transmission gear selection, the method further comprises overriding automatic transmission gear shifting to stay in the current transmission gear selection. When it is determined to initiate a gear shift, the method further comprises initiating a gear shift prior to encountering the future gradient conditions and can comprise adjusting one or both of the downshift threshold and the upshift threshold.

Future gradient conditions can be compared to a current gradient condition to calculate a gradient delta. The gradient delta can be compared to a gradient threshold. The method can be iterated until the gradient delta is greater than or equal to the gradient threshold.

Other implementations will be apparent to those skilled in the art from consideration of the specification and practice of the examples disclosed herein.

What is claimed is:

1. A method of shifting an automated transmission in a vehicle, comprising:
    tracking vehicle parameters;
    determining a current gear selection of a multiple-gear automated transmission, the automated transmission comprising computer control of shifts among the multiple gears;
    determining an upshift threshold for the current gear selection, the upshift threshold indicating a vehicle parameter at which the vehicle transmission shifts from the current gear selection to an adjacent gear of the multiple-gear transmission, the adjacent gear comprising a gear that is sequentially higher in a sequential shift routine;
    determining future gradient conditions in a lookahead distance in the vehicle operation path;
    selecting a gradient threshold;
    processing the future gradient conditions to determine a first percentage of future conditions that are above the gradient threshold;
    selecting a first percentage limit for restricting the number of future gradient conditions above the gradient threshold in the lookahead distance;
    comparing the first percentage of future conditions to the selected first percentage limit to determine that the first percentage of future conditions above the gradient threshold is within the first percentage limit;
    adjusting the upshift threshold for the current gear selection to change the vehicle parameter at which the vehicle transmission shifts from the current gear selection to the adjacent gear; and
    controlling the automated transmission to shift to the adjacent gear according to the adjusted upshift threshold.

2. The method of claim 1, comprising:
    selecting a second gradient threshold less than the gradient threshold;
    processing the future gradient conditions to determine a second percentage of future conditions that are below the second gradient threshold;
    selecting a second percentage limit for restricting the second percentage of future conditions that are below the second gradient threshold; and
    comparing the second percentage of future conditions to the selected second percentage limit to determine that the second percentage of future conditions below the gradient threshold is above the second percentage limit.

3. The method of claim 1, comprising:
    selecting a second lookahead distance that is a subset of the lookahead distance;
    determining subset future gradient conditions in the second lookahead distance;
    selecting a second gradient threshold that is more than the gradient threshold;
    processing the subset future gradient conditions to determine a second percentage of future conditions that are above the second gradient threshold;
    selecting a second percentage limit for restricting the second percentage of future conditions that are above the second gradient threshold; and
    comparing the second percentage of future conditions to the selected second percentage limit to determine that the second percentage of future conditions below the gradient threshold is below the first percentage limit.

4. The method of claim 2, wherein the vehicle parameters comprise a load and a speed, and wherein each gear of the multiple-gear transmission comprises a gradeability for a corresponding load and for a corresponding speed, the gradeability comprising a range of gradients up to a maximum positive gradient at which the gear is designed to maintain the vehicle at the corresponding speed at the corresponding load, and wherein the method comprises:
determining current vehicle parameters comprising a current load and a current speed; and
selecting the second gradient threshold to be a gradeability factor less than the maximum positive gradient at which the gear is designed to maintain the vehicle at the current speed at the current load.

5. The method of claim 3, wherein the vehicle parameters comprise a load and a speed, and wherein each gear of the multiple-gear transmission comprises a gradeability for a corresponding load and for a corresponding speed, the gradeability comprising a range of gradients up to a maximum positive gradient at which the gear is designed to maintain the vehicle at the corresponding speed at the corresponding load, and wherein the method comprises:
determining current vehicle parameters comprising a current load and a current speed; and
selecting the second gradient threshold to be a gradeability factor more than the maximum positive gradient at which the gear is designed to maintain the vehicle at the current speed at the current load.

6. The method of claim 1, further comprising collecting current gradient conditions, and determining that the current gradient conditions are greater than a predetermined negative gradient value.

7. The method of claim 1, comprising adjusting the upshift threshold to decrease time spent in the current gear and to decrease time shifting in to or out of the adjacent gear.

8. The method of claim 1, comprising shifting to the adjacent gear prior to the vehicle encountering the future gradient conditions.

9. The method of claim 1, wherein the upshift threshold is correlated to an automated cruise-control setting.

10. The method of claim 1, where adjusting the upshift threshold for the current gear selection to change the vehicle parameter at which the vehicle transmission shifts from the current gear selection to the adjacent gear comprises:
analyzing the vehicle parameters to determine a threshold parameter;
correlating the threshold parameter to an upshift scalar; and
adjusting the upshift threshold according to the upshift scalar.

11. The method of claim 10, wherein the vehicle parameter is a speed, and wherein adjustments to the upshift threshold are preconfigured to increase as the speed increases.

12. A method of shifting an automated transmission in a vehicle, comprising:
tracking vehicle parameters;
determining a current gear selection of a multiple-gear automated transmission, the automated transmission comprising computer control of shifts among the multiple gears;
determining an downshift threshold for the current gear selection, the downshift threshold indicating a vehicle parameter at which the vehicle transmission shifts from the current gear selection to an adjacent gear of the multiple-gear transmission, the adjacent gear comprising a gear that is sequentially lower in a sequential shift routine;
determining future gradient conditions in a lookahead distance in the vehicle operation path;
selecting a gradient threshold;
processing the future gradient conditions to determine a first percentage of future conditions that are above the gradient threshold;
selecting a first percentage limit for restricting the number of future gradient conditions above the gradient threshold in the lookahead distance;
comparing the first percentage of future conditions to the selected first percentage limit to determine that the first percentage of future conditions above the gradient threshold is within the first percentage limit;
adjusting the downshift threshold for the current gear selection to change the vehicle parameter at which the vehicle transmission shifts from the current gear selection to the adjacent gear; and
controlling the automated transmission to shift to the adjacent gear according to the adjusted downshift threshold.

13. The method of claim 12, wherein the vehicle parameters comprise a load and a speed, and wherein each gear of the multiple-gear transmission comprises a gradeability for a corresponding load and for a corresponding speed, the gradeability comprising a range of gradients up to a maximum positive gradient at which the gear is designed to maintain the vehicle at the corresponding speed at the corresponding load, and wherein the method comprises:
selecting a second gradient threshold that is a gradeability factor less than the maximum positive gradient at which the gear is designed to maintain the vehicle at the corresponding speed at the corresponding load;
processing the future gradient conditions to determine a second percentage of future conditions that are below the second gradient threshold;
selecting a second percentage limit for restricting the second percentage of future conditions that are below the second gradient threshold;
comparing the second percentage of future conditions to the selected second percentage limit to determine that the second percentage of future conditions below the gradient threshold is above the first percentage limit.

14. The method of claim 12, wherein the vehicle parameters comprise a load and a speed, and wherein each gear of the multiple-gear transmission comprises a gradeability for a corresponding load and for a corresponding speed, the gradeability comprising a range of gradients up to a maximum positive gradient at which the gear is designed to maintain the vehicle at the corresponding speed at the corresponding load, and wherein the method comprises:
selecting a second lookahead distance that is a subset of the lookahead distance;
determining subset future gradient conditions in the second lookahead distance;
selecting a second gradient threshold that is a gradeability factor more than the gradeability at which the gear is designed to maintain the vehicle at the corresponding speed at the corresponding load;
processing the subset future gradient conditions to determine a second percentage of future conditions that are above the second gradient threshold;
selecting a second percentage limit for restricting the second percentage of future conditions that are above the second gradient threshold; and comparing the second percentage of future conditions to the selected second percentage limit to determine that the second percentage of future conditions below the gradient threshold is below the second percentage limit.

15. The method of claim 12, further comprising collecting current gradient conditions, and determining that the current gradient conditions are greater than a predetermined negative gradient value.

16. The method of claim 12, comprising adjusting the downshift threshold to increase time spent in the current gear and to decrease time shifting in to or out of the adjacent gear.

17. The method of claim 12, comprising shifting to the adjacent gear prior to the vehicle encountering the future gradient conditions.

18. The method of claim 12, wherein the downshift threshold is correlated to an automated cruise-control setting.

19. The method of claim 12, where adjusting the downshift threshold for the current gear selection to change the vehicle parameter at which the vehicle transmission shifts from the current gear selection to the adjacent gear comprises:
    analyzing the vehicle parameters to determine a threshold parameter;
    correlating the threshold parameter to downshift scalar; and
    adjusting the downshift threshold according to the downshift scalar.

20. The method of claim 19, wherein the vehicle parameter is a speed, and wherein adjustments to the downshift threshold are preconfigured to increase as the speed increases.

21. The method of claim 19, comprising applying a saturator to limit how much the downshift threshold can be adjusted.

22. A method for predictive shifting of a vehicle transmission, comprising:
    calculating vehicle parameters comprising one or more of an engine load and an engine speed;
    determining a current transmission gear selection;
    determining engine capabilities for the determined current transmission gear selection, the engine capabilities comprising one or both of a downshift threshold and an upshift threshold;
    comparing the vehicle parameters to the engine capabilities to determine whether the vehicle parameters are within a gear shift range;
    determining future gradient conditions in the vehicle operation path;
    calculating a lookahead distance;
    calculating, comprising applying a limit based on the lookahead distance, one or more of a future engine load, a future vehicle speed, or a future fuel economy based on the future gradient conditions; and
    determining whether to initiate a gear shift or whether to stay in the current transmission gear selection based on the determined gear shift range and the calculated one or more of future engine load, future vehicle speed, or future fuel economy.

23. A method for predictive shifting of a vehicle transmission, comprising:
    calculating vehicle parameters comprising one or more of an engine load and an engine speed;
    determining a current transmission gear selection;
    determining engine capabilities for the determined current transmission gear selection, the engine capabilities comprising one or both of a downshift threshold and an upshift threshold;
    comparing the vehicle parameters to the engine capabilities to determine whether the vehicle parameters are within a gear shift range;
    determining future gradient conditions in the vehicle operation path;
    calculating one or more of a future engine load, a future vehicle speed, or a future fuel economy based on the future gradient conditions; and
    processing the determined gear shift range and the calculated one or more of future engine load, future vehicle speed, or future fuel economy;
    determining to stay in the current transmission gear selection; and
    overriding automatic transmission gear shifting to stay in the current transmission gear selection.

24. The method of claim 22, wherein, when the determining whether to initiate a gear shift or whether to stay in the current transmission gear selection results in determining to initiate a gear shift, the method further comprises initiating a gear shift prior to encountering the future gradient conditions.

25. The method of claim 22, wherein determining future gradient conditions comprises creating a profile of the road in the vehicle operation path.

26. The method of claim 25, comprising inputting data from one or more of an on-board navigation system, a Global Positioning System (GPS) device, a Light Detection and Ranging (LIDAR) device, or a Radio Detection and Ranging (RADAR) device.

27. The method of claim 23, further comprising calculating a lookahead distance.

28. The method of claim 27, further comprising limiting the calculating of one or more of a future engine load, a future vehicle speed, or a future fuel economy based on the lookahead distance.

29. A method for predictive shifting of a vehicle transmission, comprising:
    calculating vehicle parameters comprising one or more of an engine load and an engine speed;
    determining a current transmission gear selection;
    determining engine capabilities for the determined current transmission gear selection, the engine capabilities comprising one or both of a downshift threshold and an upshift threshold;
    comparing the vehicle parameters to the engine capabilities to determine whether the vehicle parameters are within a gear shift range;
    determining future gradient conditions in the vehicle operation path;
    comparing the determined future gradient conditions to a current gradient condition to calculate a gradient delta;
    comparing the gradient delta to a gradient threshold, and iterating the determining of the future gradient conditions until the gradient delta is greater than or equal to the gradient threshold;
    calculating one or more of a future engine load, a future vehicle speed, or a future fuel economy based on the future gradient conditions; and
    determining whether to initiate a gear shift or whether to stay in the current transmission gear selection based on the determined gear shift range and the calculated one or more of future engine load, future vehicle speed, or future fuel economy.

30. The method of claim 22, wherein, when the determining whether to initiate a gear shift or whether to stay in the current transmission gear selection results in determining to initiate a gear shift, the method further comprises adjusting one or both of the downshift threshold and the upshift threshold.

31. The method of claim 30, comprising adjusting the upshift threshold to initiate a gear shift to a lower engine speed.

32. A method for predictive shifting of a vehicle transmission, comprising:
- calculating vehicle parameters comprising one or more of an engine load and an engine speed;
- determining a current transmission gear selection;
- determining engine capabilities for the determined current transmission gear selection, the engine capabilities comprising one or both of a downshift threshold and an upshift threshold;
- comparing the vehicle parameters to the engine capabilities to determine whether the vehicle parameters are within a gear shift range;
- determining future gradient conditions in the vehicle operation path;
- calculating one or more of a future engine load, a future vehicle speed, or a future fuel economy based on the future gradient conditions to determine a gear shift range; and
- determining to initiate a gear shift comprising adjusting the downshift threshold to maintain a constant engine speed.

33. The method of claim 22, further comprising determining a cruise control set speed to select the gear shift range.

34. The method of claim 33, wherein the cruise control set speed is calculated by a predictive cruise control system.

35. The method of claim 33, wherein the cruise control set speed is modified by a predictive cruise control system.

36. A method for predictive shifting of a vehicle transmission, comprising:
- calculating vehicle parameters comprising one or more of an engine load and an engine speed;
- determining a current transmission gear selection;
- determining engine capabilities for the determined current transmission gear selection, the engine capabilities comprising one or both of a downshift threshold and an upshift threshold;
- comparing the vehicle parameters to the engine capabilities to determine whether the vehicle parameters are within a gear shift range;
- calculating a lookahead distance;
- determining, comprising applying a limit based on the lookahead distance, future gradient conditions in the vehicle operation path;
- calculating one or more of a future engine load, a future vehicle speed, or a future fuel economy based on the future gradient conditions; and
- determining whether to initiate a gear shift or whether to stay in the current transmission gear selection based on the determined gear shift range and the calculated one or more of future engine load, future vehicle speed, or future fuel economy.

\* \* \* \* \*